United States Patent
Horii et al.

(10) Patent No.: US 10,164,491 B2
(45) Date of Patent: Dec. 25, 2018

(54) ROTARY ELECTRIC MACHINE

(71) Applicant: Mitsubishi Electric Corporation, Tokyo (JP)

(72) Inventors: Masaki Horii, Tokyo (JP); Atsushi Sakaue, Tokyo (JP); Masaya Inoue, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 210 days.

(21) Appl. No.: 15/107,524

(22) PCT Filed: Jan. 17, 2014

(86) PCT No.: PCT/JP2014/050821
§ 371 (c)(1),
(2) Date: Jun. 23, 2016

(87) PCT Pub. No.: WO2015/107679
PCT Pub. Date: Jul. 23, 2015

(65) Prior Publication Data
US 2016/0322876 A1 Nov. 3, 2016

(51) Int. Cl.
*H02K 9/19* (2006.01)
*H02K 3/24* (2006.01)
(Continued)

(52) U.S. Cl.
CPC ............. *H02K 3/24* (2013.01); *H02K 1/32* (2013.01); *H02K 3/12* (2013.01); *H02K 3/14* (2013.01);
(Continued)

(58) Field of Classification Search
CPC .. H02K 1/00; H02K 1/14; H02K 1/20; H02K 1/22; H02K 3/00; H02K 3/04; H02K 3/12;
(Continued)

(56) References Cited

U.S. PATENT DOCUMENTS 5,965,965 A * 10/1999 Umeda ............... H02K 3/12
310/179
6,011,332 A * 1/2000 Umeda ............... H02K 3/24
310/201
(Continued)

FOREIGN PATENT DOCUMENTS

JP 48-028841 B1 9/1973
JP 2005-020943 A 1/2005
(Continued)

OTHER PUBLICATIONS

Toyota Motor Corpo., "Motor no Coil Reikyaku Sochi", Japan Institute of Invention and Innovation, Journal of Technical Disclosure, Japan Institute of Invention and Innovation, Jan. 4, 2002, 2 pages, Journal No. 2002-83.
(Continued)

*Primary Examiner* — Tran Nguyen
(74) *Attorney, Agent, or Firm* — Sughrue Mion, PLLC; Richard C. Turner

(57) ABSTRACT

Winding bodies are produced by repeatedly winding a δ-shaped coil pattern that is formed by inserting the conductor wire sequentially into a second slot, a first slot, a second slot, and a third slot, so as to alternate an axial direction of insertion into the first slot, the second slot, and the third slot, for two turns in a radial direction, and are configured such that a plurality of rectilinear portions that are respectively inserted into the first slot, the second slot, and the third slot are linked continuously by coil end portions, and a liquid coolant is supplied to a coil end that is constituted by the coil end portions.

18 Claims, 10 Drawing Sheets

(51) Int. Cl.
*H02K 1/32* (2006.01)
*H02K 3/28* (2006.01)
*H02K 3/14* (2006.01)
*H02K 3/12* (2006.01)
*H02K 1/20* (2006.01)
*H02K 3/50* (2006.01)
*H02K 5/20* (2006.01)

(52) U.S. Cl.
CPC .............. *H02K 3/28* (2013.01); *H02K 9/19* (2013.01); *H02K 1/20* (2013.01); *H02K 3/50* (2013.01); *H02K 5/20* (2013.01); *H02K 2213/03* (2013.01)

(58) Field of Classification Search
CPC   H02K 3/14; H02K 1/148; H02K 1/16; H02K 3/24; H02K 3/28; H02K 3/32; H02K 3/34; H02K 3/50; H02K 5/00
See application file for complete search history.

(56) References Cited

U.S. PATENT DOCUMENTS

| | | | | |
|---|---|---|---|---|
| 6,969,938 | B2* | 11/2005 | Seguchi | H02K 3/12 310/180 |
| 8,456,046 | B2* | 6/2013 | Bradfield | H02K 9/19 310/52 |
| 8,519,581 | B2* | 8/2013 | Bradfield | H02K 9/19 310/52 |
| 8,803,380 | B2* | 8/2014 | Chamberlin | H02K 5/20 310/54 |
| 2006/0006757 | A1* | 1/2006 | Seguchi | H02K 3/12 310/184 |
| 2009/0121575 | A1 | 5/2009 | Wolf | |
| 2009/0322167 | A1* | 12/2009 | Ishizuka | H02K 9/19 310/54 |
| 2011/0316367 | A1* | 12/2011 | Takahashi | H02K 3/24 310/54 |
| 2013/0221772 | A1* | 8/2013 | Miyamoto | H02K 9/19 310/54 |

FOREIGN PATENT DOCUMENTS

| | | |
|---|---|---|
| JP | 2009-522991 A | 6/2009 |
| JP | 2009-303293 A | 12/2009 |
| JP | 2012-125043 A | 6/2012 |
| JP | 2013-034330 A | 2/2013 |
| JP | 2013-062963 A | 4/2013 |
| JP | 2013-141410 A | 7/2013 |
| WO | 2014/006927 A1 | 1/2014 |

OTHER PUBLICATIONS

International Search Report for PCT/JP2014/050821 dated Apr. 28, 2014 [PCT/ISA/210].
Written Opinion for PCT/JP2014/050821 dated Apr. 28, 2014 [PCT/ISA/237].
Communication from European Patent Office dated Aug. 8, 2017 in European Patent Application No. 14878921.7.

* cited by examiner

ROTARY ELECTRIC MACHINE

CROSS REFERENCE TO RELATED APPLICATIONS

This application is a National Stage of International Application No. PCT/JP2014/050821 filed Jan. 17, 2014, the contents of all of which are incorporated herein by reference in their entirety.

TECHNICAL FIELD

The present invention relates to a rotary electric machine such as an electric motor or a generator, for example, and particularly relates to stator cooling.

BACKGROUND ART

In recent years, compactness and high output have been required in rotary electric machines such as electric motors or generators. With regard to downsizing rotary electric machines of this kind, stator windings that have concentrated windings in which conductor wires are wound onto individual stator core teeth have been used with a view to downsizing coil ends that do not generate effective magnetic flux. However, stators that use stator windings of distributed winding construction that can suppress torque pulsation and increase output are also in demand. In addition, because heat generated in stator windings increases together with increases in output, there is demand for improved cooling of stator windings.

Now, in contrast to concentrated windings, which are configured by winding conductor wires onto individual teeth, windings that are configured by winding conductor wires into slots that are separated by two or more slots are called "distributed windings". In other words, distributed windings are wound such that a conductor wire that extends outward from one slot spans two or more consecutive teeth and enters another slot.

In conventional rotary electric machines, distributed-winding stator windings have been produced by inserting conductor segments that are formed into a U shape in which end portions of a pair of rectilinear portions are linked together by a return portion from a first axial end of a stator core into respective pairs of slots that are separated by a pitch of one pole and joining together end portions of the conductor segments that extend outward at a second axial end of the stator core, and the stator windings have been cooled by supplying a liquid coolant to coil ends of the stator winding from vertically above (see Patent Literature 1 and 2, for example).

CITATION LIST

Patent Literature

Patent Literature 1: Japanese Patent Laid-Open No. 2013-034330 (Gazette)
Patent Literature 2: Japanese Patent Laid-Open No. 2013-062963 (Gazette)

SUMMARY OF THE INVENTION

Problem to be Solved by the Invention

In conventional rotary electric machines, because the stator windings are produced using conductor segments that are formed into a U shape in which end portions of a pair of rectilinear portions are linked together by a return portion, it is difficult to form gaps structurally, making it hard for the liquid coolant to flow in a circumferential direction of the coil ends, and one problem has been that the stator winding could not be cooled effectively.

The present invention aims to solve the above problems and an object of the present invention is to provide a compact, high-output rotary electric machine that can improve cooling of a stator winding by adapting a coil shape of a distributed-winding stator winding to make it easier for a liquid coolant to flow in a circumferential direction of coil ends.

Means for Solving the Problem

A rotary electric machine according to the present invention includes: a housing; a rotor that is fixed to a shaft that is rotatably supported by the housing such that the rotor is disposed inside the housing; a stator that includes: an annular stator core in which slots are arranged circumferentially; and a stator winding that is mounted to the stator core, the stator being held on an outer circumferential side of the rotor by the housing such that an air gap is interposed between the stator and the rotor; and a cooling mechanism that supplies a liquid coolant to a coil end of the stator winding to cool the stator winding. The stator winding includes a plurality of winding bodies that are each produced by winding a jointless continuous conductor wire that is coated with insulation, and that are arranged at a pitch of one slot in a circumferential direction so as to be mounted into a first slot, a second slot, and a third slot that line up at an angular spacing of n slots in a circumferential direction, where n is a natural number that is greater than or equal to two. The winding bodies are produced by repeatedly winding a δ-shaped coil pattern that is formed by inserting the conductor wire sequentially into the second slot, the first slot, the second slot, and the third slot, so as to alternate an axial direction of insertion into the first slot, the second slot, and the third slot, for m turns in a radial direction, where m is a natural number that is greater than or equal to one, and are configured such that a plurality of rectilinear portions that are respectively inserted into the first slot, the second slot, and the third slot are linked continuously by coil end portions; the coil end is constituted by the coil end portions; and the liquid coolant that is supplied to the coil end flows through a gap between circumferentially adjacent coil end portions among the coil end portions.

Effects of the Invention

According to the present invention, winding bodies are formed into a pattern in which a δ-shaped coil pattern is wound repeatedly for m turns in a radial direction. Thus, the bending radius in the coil end portions is reduced, enabling increases in the size of coil ends that result from lane changing to be suppressed. Furthermore, the winding bodies are distributed windings, suppressing torque pulsation and enabling increases in output to be achieved.

The winding bodies that are formed into the pattern in which the δ-shaped coil pattern is wound repeatedly for m turns in a radial direction are arranged at a pitch of one slot in a circumferential direction. Thus, flow channel groups in which coolant flow channels that are formed by gaps between circumferentially adjacent coil end portions are arranged at a pitch of one slot circumferentially and that shift axially outward in a first circumferential direction, and coolant flow channels that are formed by gaps between circumferentially adjacent third coil end portions 22g and that shift axially outward in a second circumferential direction coexist in a radial direction. Because the liquid coolant that is supplied to the coil ends thereby flows through a coolant flow channel in a first flow channel group to the end surface of the stator core, flows radially over the end surface of the stator core, and flows away from the end surface of the stator core through a coolant flow channel in a second flow channel group, the liquid coolant flows circumferentially through the coil ends while flowing radially, and is supplied inside the coil ends, enabling cooling of the coil ends to be increased.

DESCRIPTION OF EMBODIMENTS

Preferred embodiments of a rotary electric machine according to the present invention will now be explained with reference to the drawings.

Embodiment 1

Figure 1:
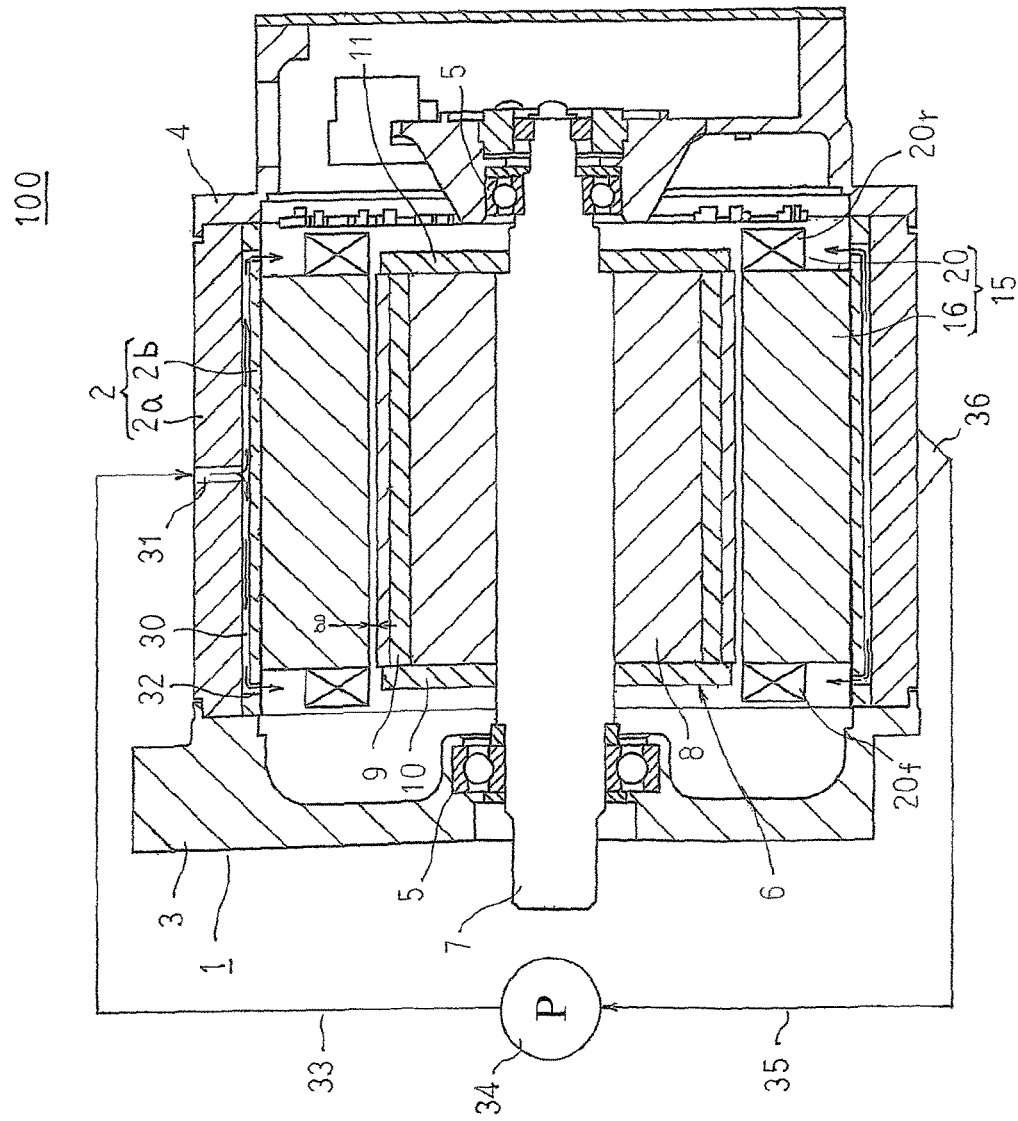
FIG. 1 is a cross section that shows a rotary electric machine according to Embodiment 1 of the present invention.
Figure 2:
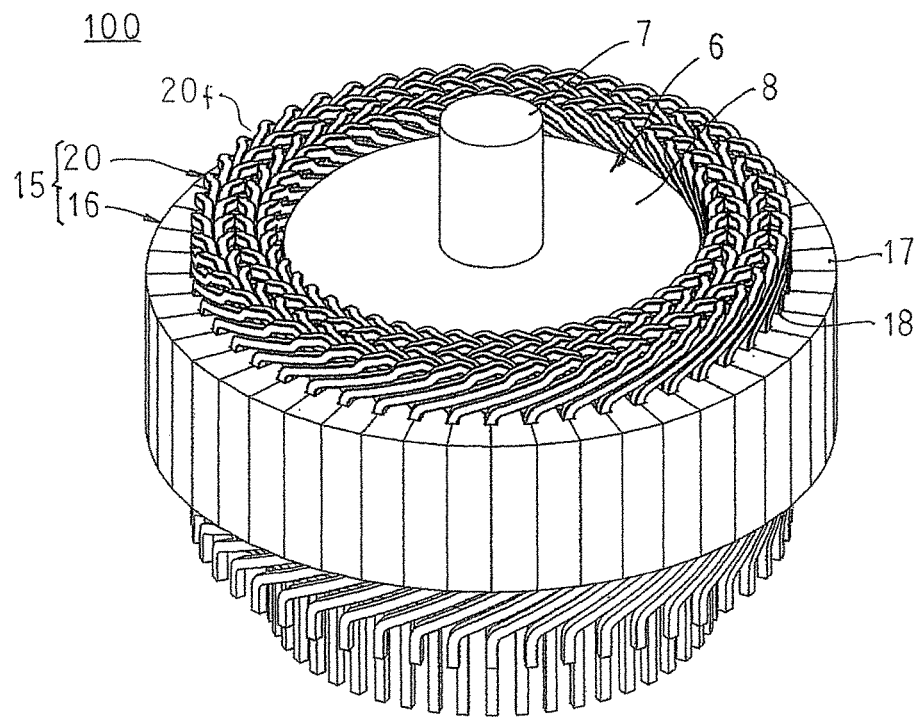
FIG. 2 is an oblique projection that shows part of the rotary electric machine according to Embodiment 1 of the present invention.
Figure 3:
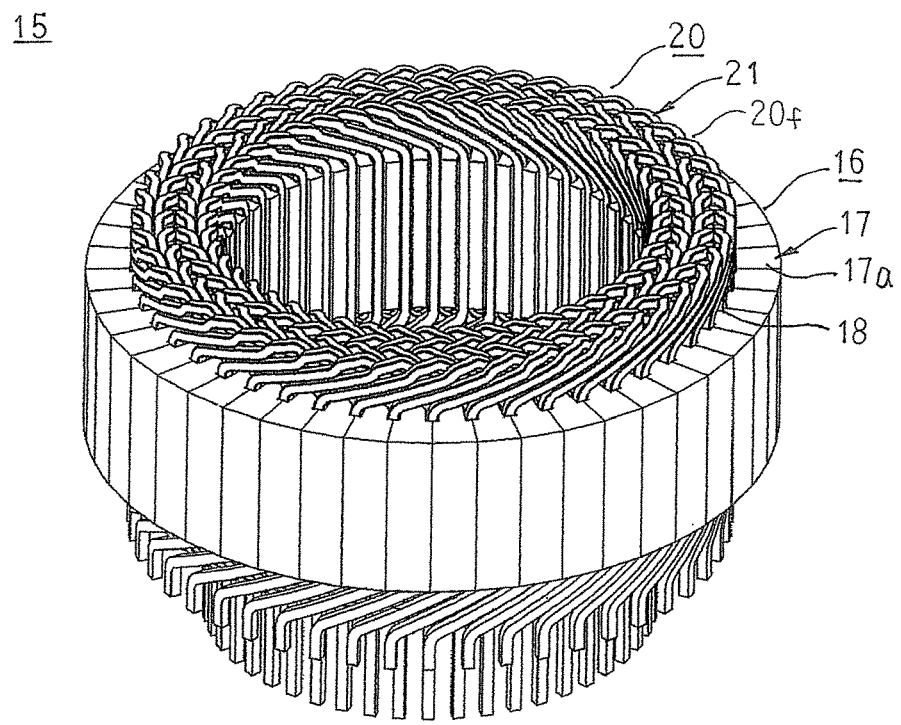
FIG. 3 is an oblique projection that shows a stator that is used in the rotary electric machine according to Embodiment 1 of the present invention.
Figure 4:
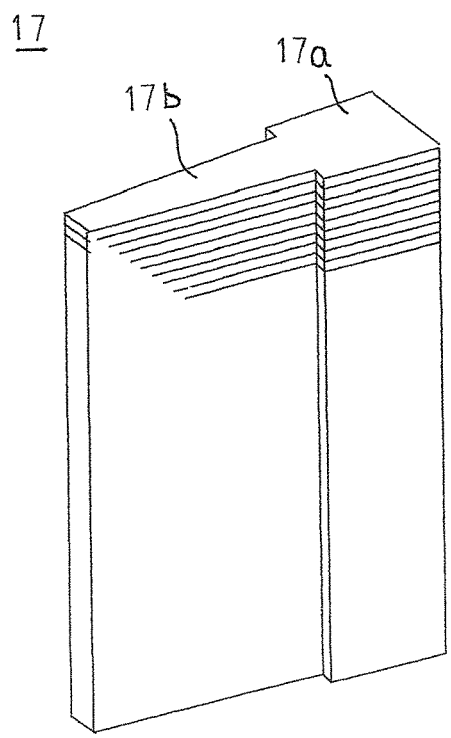
FIG. 4 is an oblique projection that shows a core block that constitutes part of a stator core that is used in the rotary electric machine according to Embodiment 1 of the present invention.
Figure 5:
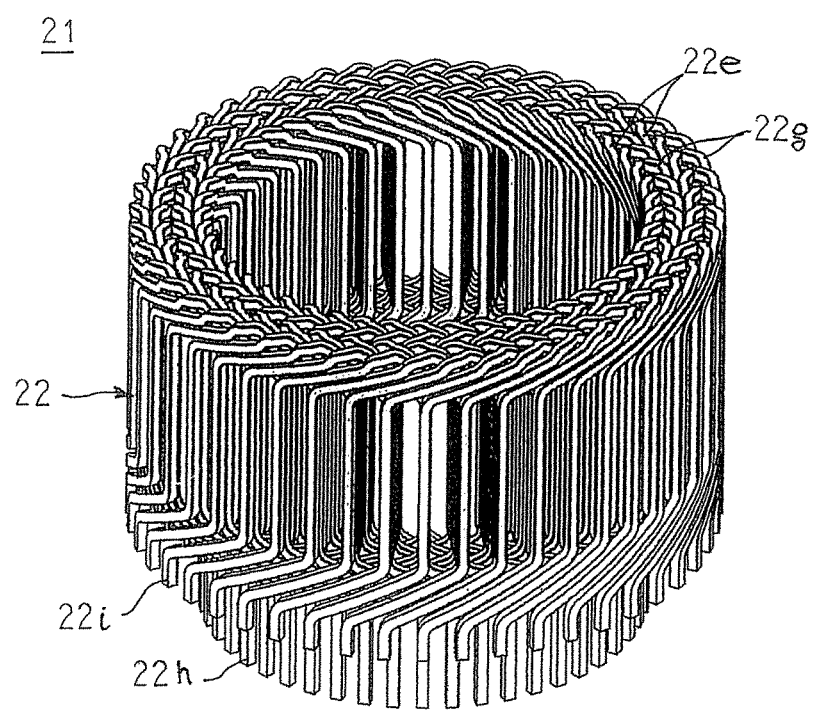
FIG. 5 is an oblique projection that shows a winding assembly that constitutes part of a stator winding of the stator that is used in the rotary electric machine according to Embodiment 1 of the present invention.
Figure 6:
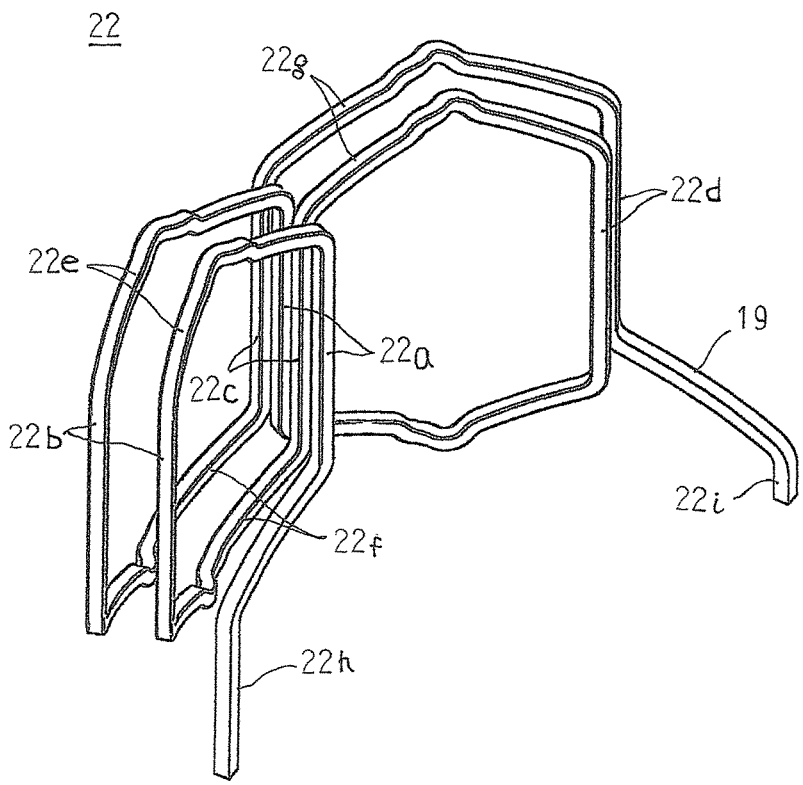
FIG. 6 is an oblique projection that shows a winding body that constitutes the winding assembly in the rotary electric machine according to Embodiment 1 of the present invention.
Figure 7:
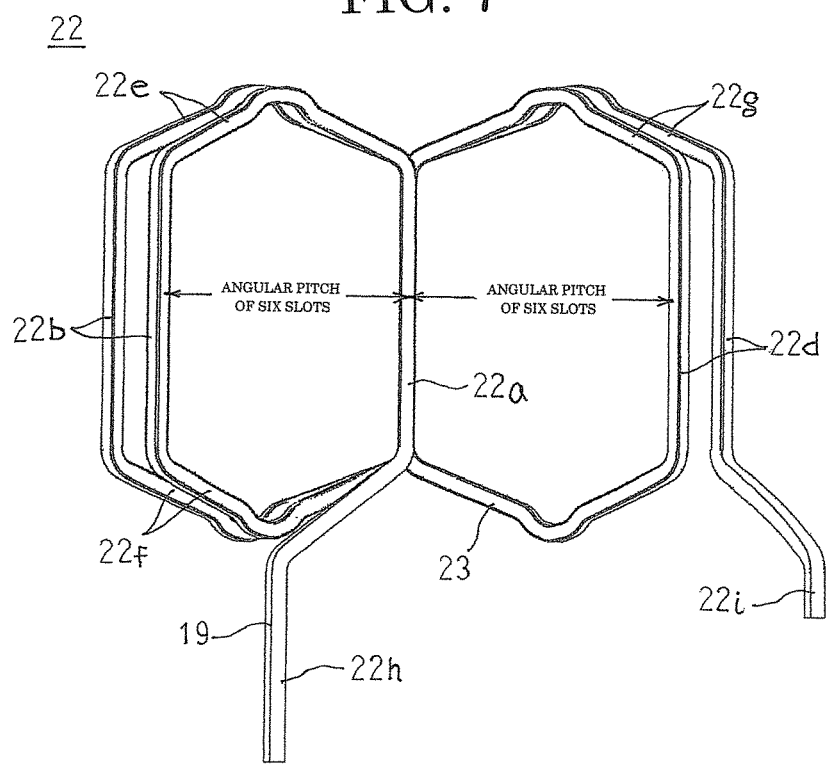
FIG. 7 is a front elevation that shows a winding body that constitutes part of the winding assembly in the rotary electric machine according to Embodiment 1 of the present invention.
Figure 8:
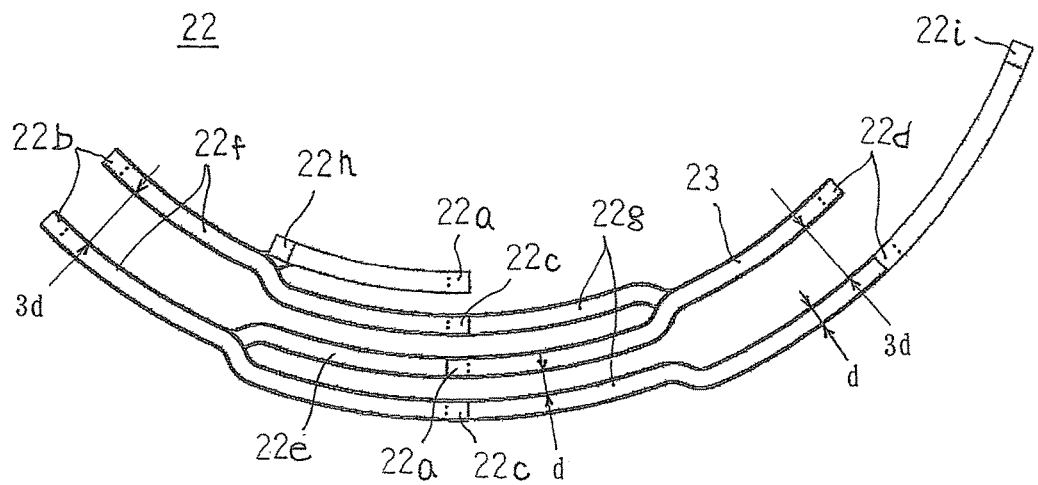
FIG. 8 is an end elevation that shows a winding body that constitutes part of the winding assembly in the rotary electric machine according to Embodiment 1 of the present invention.
Figure 9:
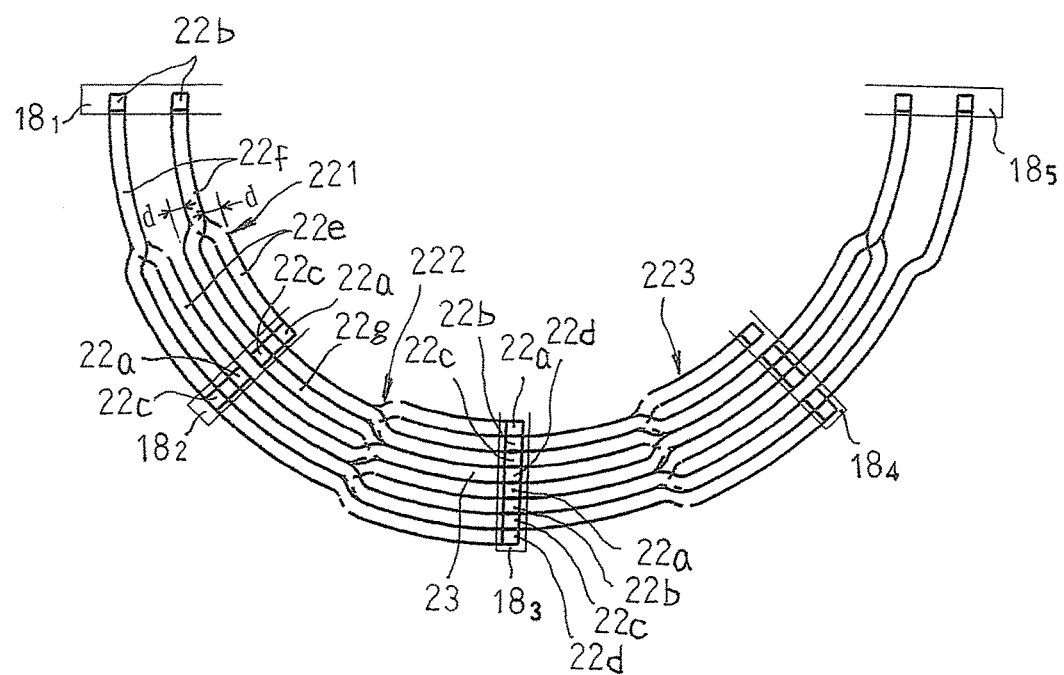
FIG. 9 is a partial end elevation of a state in which three winding bodies are mounted into the stator core so as to share a single slot in the rotary electric machine according to Embodiment 1 of the present invention when viewed from the vicinity of the first coil ends.
Figure 10:
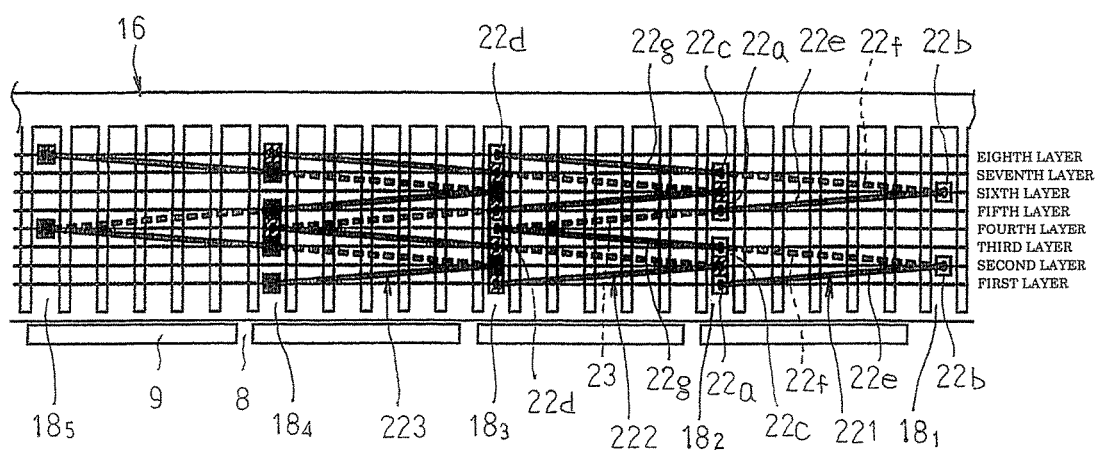
FIG. 10 is a developed projection of the state in which three winding bodies are mounted into the stator core so as to share a single slot in the rotary electric machine according to Embodiment 1 of the present invention when viewed from the vicinity of the first coil ends.
Figure 11:
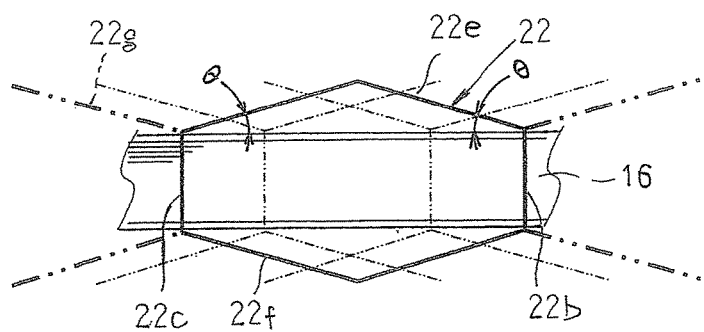
FIG. 11 is a developed projection that shows a winding body that is mounted to the stator core in the rotary electric machine according to Embodiment 1 of the present invention viewed from radially outside.
Figure 12:
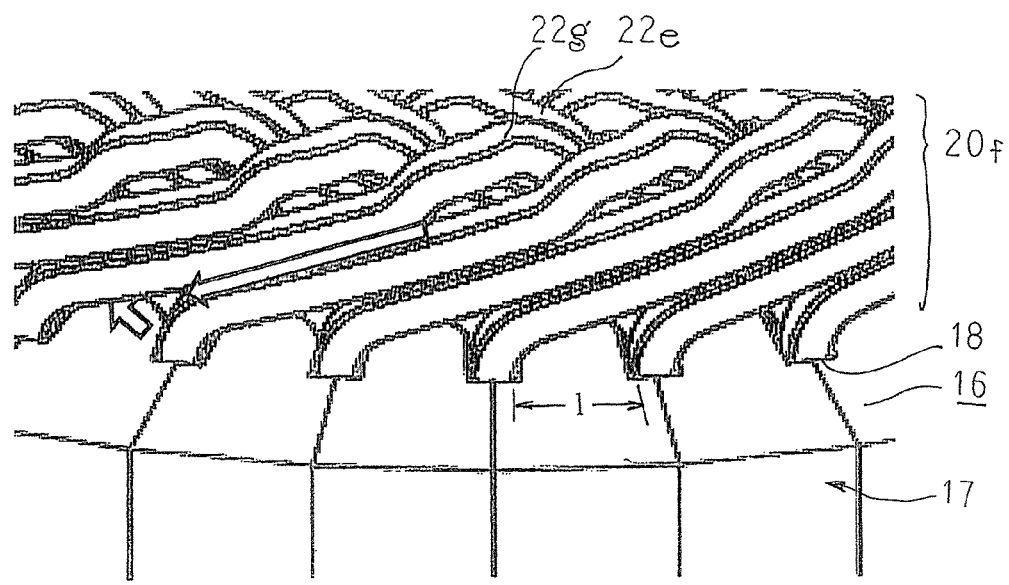
FIG. 12 is a partial enlargement that shows a vicinity of first coil ends of the stator that is used in the rotary electric machine according to Embodiment 1 of the present invention.
Figure 13:
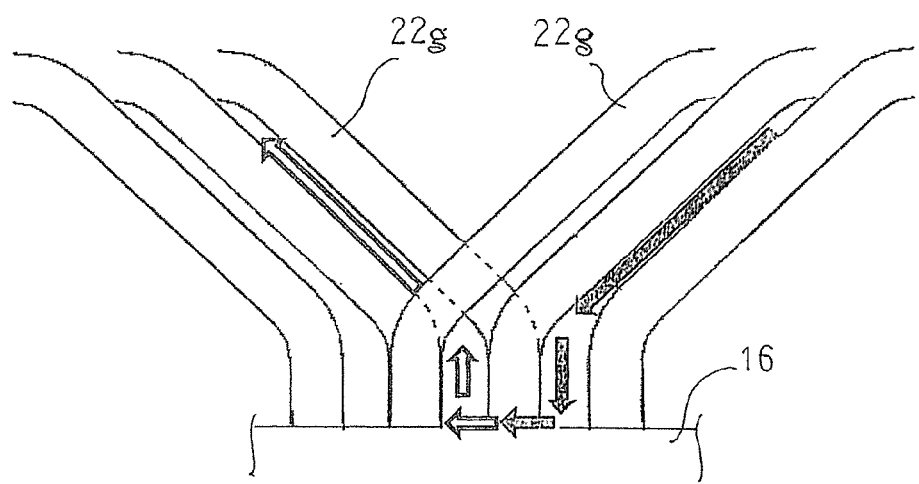
FIG. 13 is a schematic diagram that explains coolant flow in the first coil ends of the stator that is used in the rotary electric machine according to Embodiment 1 of the present invention.

FIG. 1 is a cross section that shows a rotary electric machine according to Embodiment 1 of the present invention, FIG. 2 is an oblique projection that shows part of the rotary electric machine according to Embodiment 1 of the present invention, FIG. 3 is an oblique projection that shows a stator that is used in the rotary electric machine according to Embodiment 1 of the present invention, FIG. 4 is an oblique projection that shows a core block that constitutes part of a stator core that is used in the rotary electric machine according to Embodiment 1 of the present invention, FIG. 5 is an oblique projection that shows a winding assembly that constitutes part of a stator winding of the stator that is used in the rotary electric machine according to Embodiment 1 of the present invention, FIG. 6 is an oblique projection that shows a winding body that constitutes the winding assembly in the rotary electric machine according to Embodiment 1 of the present invention, FIG. 7 is a front elevation that shows a winding body that constitutes part of the winding assembly in the rotary electric machine according to Embodiment 1 of the present invention, FIG. 8 is an end elevation that shows a winding body that constitutes part of the winding assembly in the rotary electric machine according to Embodiment 1 of the present invention, FIG. 9 is a partial end elevation of a state in which three winding bodies are mounted into the stator core so as to share a single slot in the rotary electric machine according to Embodiment 1 of the present invention when viewed from the vicinity of the first coil ends, FIG. 10 is a developed projection of the state in which three winding bodies are mounted into the stator core so as to share a single slot in the rotary electric machine according to Embodiment 1 of the present invention when viewed from the vicinity of the first coil ends, FIG. 11 is a developed projection that shows a winding body that is mounted to the stator core in the rotary electric machine according to Embodiment 1 of the present invention viewed from radially outside, FIG. 12 is a partial enlargement that shows a vicinity of first coil ends of the stator that is used in the rotary electric machine according to Embodiment 1 of the present invention, and FIG. 13 is a schematic diagram that explains coolant flow in the first coil ends of the stator that is used in the rotary electric machine according to Embodiment 1 of the present invention. Moreover, for simplicity, coil end portions are represented as straight lines in FIG. 10.

In FIGS. 1 and 2, a rotary electric machine 100 includes: a housing 1 that has: a cylindrical frame 2; and a front frame 3 and a rear frame 4 that are disposed on two axial ends of the frame 2 so as to form a sealed space together with the frame 2; a stator 15 that is fixed so as to be fitted inside the frame 2; a rotor 6 that is rotatably disposed inside the stator 15 by being fixed to a shaft 7 that is rotatably supported in the front frame 3 and the rear frame 4 by means of bearings 5; and a cooling mechanism that supplies liquid coolant to first and second coil ends 20f and 20r of a stator winding 20 of the stator 15.

The frame 2 is formed by press-fitting and integrating a cylindrical inner frame 2b that is made of aluminum inside a cylindrical outer frame 2a that is made of iron. A recessed groove that is formed around an entire circumference on an outer circumferential surface of the inner frame 2b is sealed by the outer frame 2a to form an inlet flow channel 30. A supplying aperture 31 is formed on the outer frame 2a so as to communicate between the inlet flow channel 30 and an outer side of the outer frame 2a. In addition, spraying apertures 32 are formed on the inner frame 2b such that aperture directions are in a radial direction and communicate between the inlet flow channel 30 and an inner side of the inner frame 2b. A plurality of the spraying apertures 32 are disposed at a constant pitch in a circumferential direction radially outside the first coil ends 20f and the second coil ends 20r of the stator winding 20 (described below). Supply piping 33 links the discharging orifice of the supply pump 34 and the supplying aperture 31, and return piping 35 links an oil pan 36 that is mounted below the frame 2 and the suction orifice of the supply pump 34, to configure the cooling mechanism.

The rotor 6 includes: an annular rotor core 8; the shaft 7, which is press-fitted and fixed so as to pass through a central axial position of the rotor core 8; eight permanent magnets 9 that are each mounted so as to pass through an outer circumferential side of the rotor core 8; and a first end plate 10 and a second end plate 11 that are press-fitted onto and fixed to the shaft 7, and that are disposed so as to contact two axial end surfaces of the rotor core 8.

Next, configuration of the stator 15 will be explained in detail with reference to FIGS. 3 through 11.

As shown in FIG. 3, the stator 15 includes: a stator core 16; and the stator winding 20, which is mounted to the stator core 16. Here, to facilitate explanation, the number of poles in the rotor 6 is eight, the number of slots in the stator core 16 is forty-eight, and the stator winding 20 is a three-phase winding. In other words, the slots are formed on the stator core 16 at a ratio of two slots per phase per pole.

As shown in FIG. 4, core blocks 17 are made by dividing the annular stator core 16 into forty-eight equal sections circumferentially, are produced by laminating and integrating electromagnetic steel sheets, and include: a core back portion 17a that has a circular arc-shaped cross section; and a tooth 17b that is disposed so as to protrude radially inward from an inner circumferential wall surface of the core back portion 17a. The stator core 16 is configured into an annular shape by arranging and integrating the forty-eight core blocks 17 circumferentially by butting together circumferential side surfaces of the core back portions 17a such that the teeth 17b are oriented radially inward. The slots 18, which are formed by circumferentially adjacent core blocks 17, are arranged at a uniform angular pitch circumferentially so as to be open on an inner circumferential side. The teeth 17b are formed so as to have a tapered shape in which a circumferential width becomes gradually narrower radially inward, and a cross section of the slots 18 is oblong.

The winding bodies 22 are produced by winding conductor wire 19 continuously into a δ-shaped coil pattern for two turns in an edgewise winding, the conductor wire 19 being made of jointless continuous copper wire or aluminum wire that is insulated using an enamel resin, for example, and having an oblong cross section. Specifically, as shown in FIGS. 6 through 8, the winding bodies 22 are configured such that two δ-shaped coil patterns that are formed by a first rectilinear portion 22a, a first coil end portion 22e, a second rectilinear portion 22b, a second coil end portion 22f, a third rectilinear portion 22c, a third coil end portion 22g, and a fourth rectilinear portion 22d are arranged in a longitudinal direction of short sides of the oblong cross sections of the conductor wire 19, and the fourth rectilinear portion 22d and the first rectilinear portion 22a are linked using a crossover wire 23. The crossover wires 23 constitute coil end portions, winding start end portions of the conductor wires 19 constitute winding ends 22h that function as first conductor terminals, and winding finish end portions constitute winding ends 22i that function as second conductor terminals.

In winding bodies 22 that are configured in this manner, four first rectilinear portions 22a and third rectilinear portions 22c are arranged in a single column such that longitudinal directions of long sides of the oblong cross sections are oriented in a circumferential direction so as to leave gaps d in the longitudinal direction of the short sides of the oblong cross sections. Two second rectilinear portions 22b are arranged so as to be separated by an angular spacing of six slots in a first circumferential direction from the column of the first rectilinear portions 22a and the third rectilinear portions 22c such that longitudinal directions of long sides of the oblong cross sections are oriented in a circumferential direction so as to leave a gap 3d in the longitudinal direction of the short sides of the oblong cross sections. Two fourth rectilinear portions 22d are arranged so as to be separated by an angular spacing of six slots in a second circumferential direction from the column of the first rectilinear portions 22a and the third rectilinear portions 22c such that longitudinal directions of long sides of the oblong cross sections are oriented in a circumferential direction so as to leave a gap 3d in the longitudinal direction of the short sides of the oblong cross sections. Moreover, an angular spacing of six slots is a spacing between slot centers of slots 18 on two sides of six consecutive teeth 17b. Here, an angular spacing of six slots corresponds to a pitch of one magnetic pole. d is a length of a short side of the conductor wire 19.

A winding assembly 21 that is shown in FIG. 5 is assembled by arranging forty-eight winding bodies 22 that are configured in this manner at a pitch of one slot circumferentially. In this winding assembly 21, forty-eight columns of eight first through fourth rectilinear portions 22a, 22b, 22c, and 22d that are lined up in a single column radially are arranged circumferentially at a pitch of one slot. The respective columns of eight first through fourth rectilinear portions 22a, 22b, 22c, and 22d that are lined up in a single column radially are housed in each of the slots 18.

The forty-eight core blocks 17 are arranged at an approximately uniform angular pitch circumferentially such that the respective teeth 17b are positioned on a radially outer side between adjacent columns of first through fourth rectilinear portions 22a, 22b, 22c, and 22d of the winding assembly 21. Next, the core blocks 17 that are arranged circumferentially are moved radially inward, to insert the respective teeth 17b of the core blocks 17 between the adjacent columns of first through fourth rectilinear portions 22a, 22b, 22c, and 22d.

As shown in FIG. 3, circumferential side surfaces of the adjacent core blocks 17 are butted together to mount the forty-eight core blocks 17 into the winding assembly 21. Next, the core blocks 17 that are arranged into an annular shape are integrated by being pressed into and fixed to the frame 2, to produce the stator core 16. Furthermore, a connection process is applied to the winding assembly 21 to form the stator winding 20. The stator winding 20 is thereby mounted to the stator core 16, assembling the stator 15. Eight first through fourth rectilinear portions 22a, 22b, 22c, and 22d are housed in each of the slots 18 such that the longitudinal directions of the long sides of the oblong cross sections are oriented circumferentially so as to be arranged in a single column in a radial direction.

FIGS. 9 and 10 show a state in which three winding bodies 22 are each mounted into the stator core 16 so as to share one slot 18, and FIG. 11 shows the state in which the winding bodies 22 are mounted into the stator core 16 when viewed from radially outside. Here, five slots 18 that line up circumferentially at an angular spacing of six slots will be designated a first slot $18_1$, a second slot $18_2$, a third slot $18_3$, a fourth slot $18_4$, and a fifth slot $18_5$ in circumferential order.

Focusing on the first winding body 22 (hereinafter "winding body 221"), a first coil end portion 22e that extends outward at a second axial end (a vicinity of the first coil ends 20f) from a first rectilinear portion 22a in a first layer from a slot opening side of a second slot $18_2$ extends toward a first slot $18_1$ circumferentially at an angle of inclination θ, is lane-changed (shifted) radially outward at a vertex portion by a distance d, subsequently extends toward the first slot $18_1$ circumferentially at a reverse angle of inclination θ, and is linked to a second rectilinear portion 22b in a second layer from a slot opening side of the first slot $18_1$. Next, a second coil end portion 22f that extends outward at a first axial end (a vicinity of the second coil ends $20_r$) from the second rectilinear portion 22b in the second layer from the slot opening side of the first slot $18_1$ extends toward the second slot $18_2$ circumferentially at an angle of inclination θ, is shifted radially outward at a vertex portion by a distance d, subsequently extends toward the second slot $18_2$ circumferentially at a reverse angle of inclination θ, and is linked to a third rectilinear portion 22c in a third layer from the slot opening side of the second slot $18_2$.

Next, a third coil end portion 22g that extends outward in the vicinity of the first coil ends 20f from the third rectilinear portion 22c in the third layer from the slot opening side of the second slot $18_2$ extends toward a third slot $18_3$ circumferentially at an angle of inclination θ, is shifted radially outward at a vertex portion by a distance d, subsequently extends toward the third slot $18_3$ circumferentially at a reverse angle of inclination θ, and is linked to a fourth rectilinear portion 22d in a fourth layer from a slot opening side of the third slot $18_3$.

Next, a crossover wire 23 that extends outward in the vicinity of the second coil ends $20_r$ from the fourth rectilinear portion 22d in the fourth layer from the slot opening side of the third slot $18_3$ extends toward the second slot $18_2$ circumferentially at an angle of inclination θ, is shifted radially outward at a vertex portion by a distance d, subsequently extends toward the second slot $18_2$ circumferentially at a reverse angle of inclination θ, and is linked to a first rectilinear portion 22a in a fifth layer from the slot opening side of the second slot $18_2$. A first coil end portion 22e that extends outward in the vicinity of the first coil ends 20f from the first rectilinear portion 22a in the fifth layer from the slot opening side of the second slot $18_2$ extends toward a first slot $18_1$ circumferentially at an angle of inclination θ, is shifted radially outward at a vertex portion by a distance d, subsequently extends toward the first slot $18_1$ circumferentially at a reverse angle of inclination θ, and is linked to a second rectilinear portion 22b in a sixth layer from the slot opening side of the first slot $18_1$.

Next, a second coil end portion 22f that extends outward in the vicinity of the second coil ends $20_r$ from the second rectilinear portion 22b in the sixth layer from the slot opening side of the first slot $18_1$ extends toward the second slot $18_2$ circumferentially at an angle of inclination θ, is shifted radially outward at a vertex portion by a distance d, subsequently extends toward the second slot $18_2$ circumferentially at a reverse angle of inclination θ, and is linked to a third rectilinear portion 22c in a seventh layer from the slot opening side of the second slot $18_2$. Next, a third coil end portion 22g that extends outward in the vicinity of the first coil ends 20f from the third rectilinear portion 22c in the seventh layer from the slot opening side of the second slot $18_2$ extends toward a third slot $18_3$ circumferentially at an angle of inclination θ, is shifted radially outward at a vertex portion by a distance d, subsequently extends toward the third slot $18_3$ circumferentially at a reverse angle of inclination θ, and is linked to a fourth rectilinear portion 22d in an eighth layer from a slot opening side of the third slot $18_3$.

Thus, the first rectilinear portion 22a in the first layer of the second slot $18_2$ and the second rectilinear portion 22b in the second layer of the first slot $18_1$ are linked by the first coil end portion 22e, the second rectilinear portion 22b in the second layer of the first slot $18_1$ and the third rectilinear portion 22c in the third layer of the second slot $18_2$ are linked by the second coil end portion 22f, and the third rectilinear portion 22c in the third layer of the second slot $18_2$ and the fourth rectilinear portion 22d in the fourth layer of the third slot $18_3$ are linked by the third coil end portion 22g, to form the δ-shaped coil pattern.

In addition, the first rectilinear portion 22a in the fifth layer of the second slot $18_2$ and the second rectilinear portion 22b in the sixth layer of the first slot $18_1$ are linked by the first coil end portion 22e, the second rectilinear portion 22b in the sixth layer of the first slot $18_1$ and the third rectilinear portion 22c in the seventh layer of the second slot $18_2$ are linked by the second coil end portion 22f, and the third rectilinear portion 22c in the seventh layer of the second slot $18_2$ and the fourth rectilinear portion 22d in the eighth layer of the third slot $18_3$ are linked by the third coil end portion 22g, to form the δ-shaped coil pattern. The fourth rectilinear portion 22d in the fourth layer of the third slot $18_3$ and the first rectilinear portions 22a in the fifth layer of the second slot $18_2$ are linked by a crossover wire 23.

Thus, the first winding body 221 is configured by linking the two δ-shaped coil patterns using a crossover wire 23 so as to be arranged into two layers in a radial direction. In the first through third coil end portions 22e, 22f, and 22g and the crossover wire 23, inclined portions that extend from the end portions of the first through fourth rectilinear portions 22a, 22b, 22c, and 22d to the vertex portion are formed so as to have an approximate circular arc shape when viewed from an axial direction. In other words, the inclined portions of the first through third coil end portions 22e, 22f, and 22g and the crossover wire 23 maintain their radial positions.

Similarly, a second winding body 222 is mounted into the second slot $18_2$, the third slot $18_3$, and the fourth slot $18_4$, and a third winding body 223 is mounted into the third slot $18_3$, the fourth slot $18_4$, and the fifth slot $18_5$. Eight first through fourth rectilinear portions 22a, 22b, 22c, and 22d are housed in a slot $18_3$ that is shared by the three winding bodies 221, 222, and 223 such that the longitudinal directions of the long sides of the oblong cross sections of the conductor wires 19 are oriented circumferentially so as to line up in a single column in a radial direction.

In the stator winding 20 that is configured in this manner, the first coil end portion 22e that extends outward in a vicinity of the first coil ends 20f from the first rectilinear portion 22a that is positioned in the first layer of a winding body 22 extends in a first circumferential direction so as to pass over the first coil end portion 22e that extends outward in a vicinity of the first coil ends 20f from the first rectilinear portion 22a that is positioned in the first layer of the winding body 22 that is positioned adjacently in the first circumferential direction, is shifted at the vertex portion radially outward by a distance d, extends in the first circumferential direction so as to pass under the first coil end portion 22e of the winding body 22 that is positioned adjacently in the first circumferential direction, and is connected to a second rectilinear portion 22b.

The second coil end portion 22f that extends outward in a vicinity of the second coil ends 20r from the second rectilinear portion 22b of the winding body 22 extends in a second circumferential direction so as to pass under the second coil end portion 22f that extends outward in a vicinity of the second coil ends 20r from the second rectilinear portion 22b of the winding body 22 that is positioned adjacently in the first circumferential direction, emerges before the vertex portion, is shifted at the vertex portion radially outward by a distance d, extends in the second circumferential direction so as to pass over the second coil end portion 22f of the winding body 22 that is positioned adjacently in the first circumferential direction, and is connected to a third rectilinear portion 22c.

The third coil end portion 22g that extends outward in a vicinity of the first coil ends 20f from the third rectilinear portion 22c of the winding body 22 extends in the first circumferential direction so as to pass under the third coil end portion 22g that extends outward from the third rectilinear portion 22c of the winding body 22 that is positioned adjacently in the first circumferential direction, emerges before the vertex portion, is shifted at the vertex portion radially outward by a distance d, extends in the first circumferential direction so as to pass over the third coil end portion 22g of the winding body 22 that is positioned adjacently in the first circumferential direction, and is connected to a fourth rectilinear portion 22d.

Thus, as shown in FIG. 12, in the first coil ends 20f, gaps are formed between the inclined portions of the circumferentially adjacent first coil end portions 22e and between the inclined portions of the third coil end portions 22g. In the second coil ends 20r, gaps are formed between the inclined portions of the second coil end portions 22f and between the inclined portions of the crossover wires 23. These gaps constitute liquid coolant flow channels.

A rotary electric machine 100 that is configured in this manner operates as an eight-pole, forty-eight-slot inner-rotor three-phase motor when alternating-current power is supplied to the stator winding 20. The supply pump 34 is driven such that a liquid coolant such as automatic transmission fluid (ATF) oil, or engine oil, etc., is supplied to the inlet flow channel 30 by means of the supply piping 33 and the supplying aperture 31. The liquid coolant that is supplied to the inlet flow channel 30 is sprayed onto the first and second coil ends 20f and 20r from the spraying apertures 32. Because circumferential gaps 1 between root portions of the first coil end portions 22e are approximately 5 mm, while the air gap g between the rotor 6 and the stator 15 is approximately 1 mm, the liquid coolant is less likely to flow into the air gap. Circumferential gaps between root portions of the second coil end portions 22f, circumferential gaps between root portions of the third coil end portions 22g, and circumferential gaps between root portions of the crossover wires 23 are also equal to circumferential gaps between root portions of the first coil end portions 22e. Thus, the liquid coolant that is sprayed onto the first and second coil ends 20f and 20r serves to cool the first and second coil ends 20r without flowing into the air gap between the rotor 6 and the stator 15.

As indicated by the arrows in FIGS. 12 and 13, the liquid coolant that is sprayed onto the first coil ends 20f from radially outside flows from the vertex portions toward the roots through the gaps between the inclined portions of the circumferentially adjacent third coil end portions 22g that are positioned on the outermost circumference. Then the liquid coolant flows radially inward over the end surface of the stator core 16, and is sucked up between the root portions of the radially adjacent third coil end portions 22g by capillary action. Next, as indicated by the arrows in FIGS. 12 and 13, the liquid coolant flows toward the vertex portions through the gaps between the inclined portions of the third coil end portions 22g that are positioned on a radially inner side of the inclined portions of the third coil end portions 22g that are positioned on the outermost circumference. In addition, the liquid coolant flows radially inward over the end surface of the stator core 16, and is sucked up between the root portions of the radially adjacent first coil end portions 22e by capillary action. Then, the liquid coolant flows toward the vertex portions through the gaps between the inclined portions of the circumferentially adjacent first coil end portions 22e.

In this manner, the liquid coolant that is sprayed onto the first coil ends 20f flows circumferentially through the gaps between the inclined portions of the circumferentially adjacent first coil end portions 22e and the gaps between the inclined portions of the circumferentially adjacent third coil end portions 22g. In addition, the liquid coolant flows radially inward over the end surface of the stator core 16. The liquid coolant thereby flows radially and circumferentially on the first coil ends 20f, and flows inside the first coil ends 20f, cooling the first coil ends 20f effectively.

Although not shown, the liquid coolant that is sprayed onto the second coil ends 20r from radially outside flows from the vertex portions toward the roots through the gaps between the inclined portions of the circumferentially adjacent second coil end portions 22f that are positioned on the outermost circumference. Then the liquid coolant flows radially inward over the end surface of the stator core 16, and is sucked up between the root portions of the radially adjacent second coil end portions 22f by capillary action. Next, the liquid coolant flows toward the vertex portions through the gaps between the inclined portions of the second coil end portions 22f that are positioned on a radially inner side of the inclined portions of the second coil end portions 22f that are positioned on the outermost circumference. In addition, the liquid coolant flows radially inward over the end surface of the stator core 16, and is sucked up between the root portions of the radially adjacent crossover wires 23 by capillary action. Then, the liquid coolant flows toward the vertex portions through the gaps between the inclined portions of the circumferentially adjacent crossover wires 23.

In this manner, the liquid coolant that is sprayed onto the second coil ends 20r flows circumferentially through the gaps between the inclined portions of the circumferentially adjacent second coil end portions 22f and the gaps between the inclined portions of the circumferentially adjacent crossover wires 23. In addition, the liquid coolant flows radially inward over the end surface of the stator core 16. The liquid coolant thereby flows radially and circumferentially on the second coil ends 20r, and flows inside the second coil ends 20r, cooling the second coil ends 20r effectively.

The liquid coolant that has cooled the first and second coil ends 20f and 20r is collected in a lower portion inside the frame 2, and is returned to the supply pump 34 from the oil pan 36 by means of the return piping 35.

According to Embodiment 1, winding bodies 22 are produced by winding a δ-shaped coil pattern that is formed by inserting a conductor wire 19 sequentially into a second slot $18_2$, a first slot $18_1$, the second slot $18_2$, and a third slot $18_3$, so as to alternate an axial direction of insertion into the first slot $18_1$, the second slot $18_2$, and the third slot $18_3$, so as to be repeated for two turns.

Thus, the bending radius in vertex portions of first through third coil end portions 22e, 22f, and 22g and crossover wires 23 is reduced, enabling increases in the size of first and second coil ends 20f and 20r that result from lane changing to be suppressed. Furthermore, the winding bodies 22 are distributed windings, suppressing torque pulsation and enabling increases in output to be achieved.

In the first coil ends 20f, flow channel groups in which coolant flow channels that are formed by gaps between circumferentially adjacent first coil end portions 22e are arranged at a pitch of one slot circumferentially, and coolant flow channels that are formed by gaps between circumferentially adjacent third coil end portions 22g coexist in a radial direction. Thus, liquid coolant that is supplied to the first coil ends 20f flows through the coolant flow channels that are formed by the gaps between the third coil end portions 22g to an end surface of the stator core 16, flows radially inward over the end surface of the stator core 16, and flows away from the end surface of the stator core 16 through the coolant flow channels that are formed by the gaps between the first coil end portions 22e. The liquid coolant thereby flows circumferentially along the first coil ends 20f while flowing radially inward, and is supplied inside the first coil ends 20f, improving cooling of the first coil ends 20f.

In the second coil ends 20r, on the other hand, flow channel groups in which coolant flow channels that are formed by gaps between circumferentially adjacent second coil end portions 22f are arranged at a pitch of one slot circumferentially, and coolant flow channels that are formed by gaps between circumferentially adjacent crossover wires 23 coexist in a radial direction. Thus, liquid coolant that is supplied to the second coil ends 20r flows through the coolant flow channels that are formed by the gaps between the second coil end portions 22f to an end surface of the stator core 16, flows radially inward over the end surface of the stator core 16, and flows away from the end surface of the stator core 16 through the coolant flow channels that are formed by the gaps between the crossover wires 23. The liquid coolant thereby flows circumferentially along the second coil ends 20r while flowing radially inward, and is supplied inside the second coil ends 20r, improving cooling of the second coil ends 20r.

The housed positions of the first through fourth rectilinear portions 22a, 22b, 22c, and 22d of the winding bodies 22 in the radial direction inside the first slot $18_1$, the second slot $18_2$, and the third slot $18_3$ are shifted sequentially in a first radial direction by the radial thickness d of the first through fourth rectilinear portions 22a, 22b, 22c, and 22d in order of the second slot $18_2$, the first slot $18_1$, the second slot $18_2$, the third slot $18_3$. Assembly of the winding assembly 21 can thereby be improved.

In the first coil ends 20f, directions of the first and third coil end portions 22e and 22g that extend circumferentially from the first through fourth rectilinear portions 22a, 22b, 22c, and 22d that are housed so as to be arranged in a single row in the slots 18 are repeated so as to alternate between an identical direction and an opposite direction in a radial direction. In the second coil ends 20r, directions of the second coil end portions 22f and the crossover wires 23 that extend circumferentially from the first through fourth rectilinear portions 22a, 22b, 22c, and 22d that are housed so as to be arranged in a single row in the slots 18 are repeated so as to alternate between an identical direction and an opposite direction in a radial direction.

Thus, in the first coil ends 20f, flow channel groups in which coolant flow channels that are formed by gaps between circumferentially adjacent first coil end portions 22e are arranged at a pitch of one slot circumferentially, and coolant flow channels that are formed by gaps between circumferentially adjacent third coil end portions 22g are arranged so as to repeat alternately in a radial direction. Flow channel groups in which flow channel directions extend axially outward in a first circumferential direction and flow channel groups in which flow channel directions extend axially outward in a second circumferential direction are arranged so as to repeat alternately in the radial direction. The liquid coolant thereby flows easily circumferentially along the first coil ends 20f, further improving cooling of the first coil ends 20f.

In the second coil ends 20r, flow channel groups in which coolant flow channels that are formed by gaps between circumferentially adjacent second coil end portions 22f are arranged at a pitch of one slot circumferentially, and coolant flow channels that are formed by gaps between circumferentially adjacent crossover wires 23 are also arranged so as to repeat alternately in a radial direction. Flow channel groups in which flow channel directions extend axially outward in a first circumferential direction and flow channel groups in which flow channel directions extend axially outward in a second circumferential direction are arranged so as to repeat alternately in the radial direction. The liquid coolant thereby flows easily circumferentially along the second coil ends 20r, further improving cooling of the second coil ends 20r.

Moreover, in Embodiment 1 above, aperture directions of spraying apertures that are formed on the inner frame 2b are in a radial direction, but aperture directions of spraying apertures may be inclined relative to a radial direction such that liquid coolant spraying directions are parallel to directions of inclination of inclined portions of second coil end portions and third coil end portions. The liquid coolant is thereby more likely to flow into the first and second coil ends 20f and 20r, enabling the first and second coil ends 20f and 20r to be cooled effectively.

Embodiment 2

Figure 14:
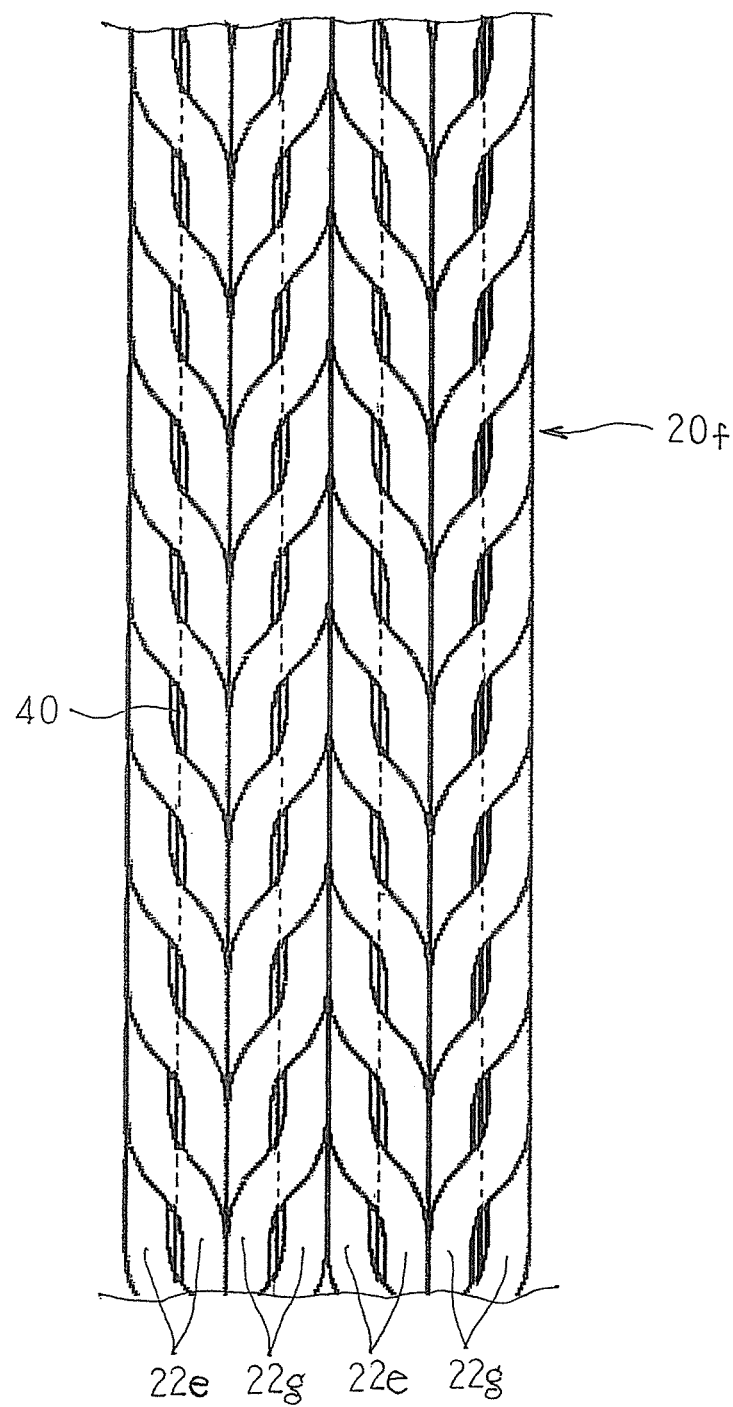
FIG. 14 is a partial end elevation that shows first coil ends of a stator that is used in a rotary electric machine according to Embodiment 2 of the present invention.
Figure 15:
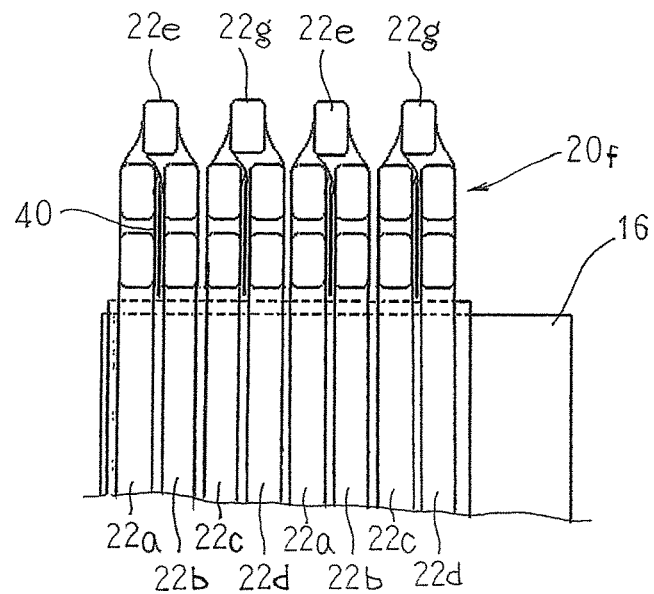
FIG. 15 is a partial cross section that shows a vicinity of first coil ends of the stator that is used in the rotary electric machine according to Embodiment 2 of the present invention.

FIG. 14 is a partial end elevation that shows first coil ends of a stator that is used in a rotary electric machine according to Embodiment 2 of the present invention, and FIG. 15 is a partial cross section that shows a vicinity of first coil ends of the stator that is used in the rotary electric machine according to Embodiment 2 of the present invention.

In FIGS. 14 and 15, insulating sheets 40 that function as partitioning members are respectively inserted around an entire circumference into gaps between inclined portions that extend from first rectilinear portions 22a to vertex portions of first coil end portions 22e and inclined portions that extend from second rectilinear portions 22b to the vertex portions, and gaps between inclined portions that extend from third rectilinear portions 22c to vertex portions of third coil end portions 22g and inclined portions that extend from fourth rectilinear portions 22d to the vertex portions. Although not shown, they are also respectively inserted around an entire circumference into gaps between inclined portions that extend from second rectilinear portions 22b to vertex portions of second coil end portions 22f and inclined portions that extend from second rectilinear portions 22b to the vertex portions, and gaps between inclined portions that extend from third rectilinear portions 22c to vertex portions of crossover wires 23 and inclined portions that extend from fourth rectilinear portions 22d to the vertex portions. The insulating sheets 40 are formed into strip shapes using a sheet material that is made of a glass cloth, a polyetheretherketone, polyphenyl sulfide, or polytetrafluoroethylene, etc.

Moreover, the rest of the configuration is formed in a similar or identical manner to that of Embodiment 1 above.

Consequently, similar or identical effects to those of Embodiment 1 above can also be achieved in Embodiment 2.

From FIG. 10, it can be seen that the first and third coil end portions 22e and 22g extend outward from the second and third rectilinear portions 22b and 22c in the second and third layers of the slots 18 in identical circumferential directions. Similarly, it can be seen that the first and third coil end portions 22e and 22g extend outward from the fourth and first rectilinear portions 22d and 22a in the fourth and fifth layers of the slots 18 in identical circumferential directions. It can also be seen that the first and third coil end portions 22e and 22g extend outward from the second and third rectilinear portions 22b and 22c in the sixth and seventh layers of the slots 18 in identical circumferential directions. In other words, in the first coil ends 20f, same-phase coil end portions that extend outward from the rectilinear portions in the second and third layers of the slots 18, from the rectilinear portions in the fourth and fifth layers, and from the rectilinear portions in the sixth and seventh layers, are disposed so as to be radially adjacent, and the electric potential difference between the coil end portions is small.

From FIG. 10, it can be seen that the first coil end portions 22e extend outward from the first and second rectilinear portions 22a and 22b in the first and second layers of the slots 18 in opposite circumferential directions. It can also be seen that the third coil end portions 22g extend outward from the third and fourth rectilinear portions 22c and 22d in the third and fourth layers of the slots 18 in opposite circumferential directions. It can also be seen that the first coil end portions 22e extend outward from the first and second rectilinear portions 22a and 22b in the fifth and sixth layers of the slots 18 in opposite circumferential directions. It can also be seen that the third coil end portions 22g extend outward from the third and fourth rectilinear portions 22c and 22d in the seventh and eighth layers of the slots 18 in opposite circumferential directions. In other words, in the first coil ends 20f, different-phase coil end portions that extend outward from the rectilinear portions in the first and second layers of the slots 18, from the rectilinear portions in the third and fourth layers, from the rectilinear portions in the fifth and sixth layers, and from the rectilinear portions in the seventh and eighth layers, cross radially, and the electric potential difference between the coil end portions is large.

In Embodiment 2, in the first coil ends 20f, the insulating sheets 40 are inserted between the inclined portions of the first coil end portions 22e that respectively extend outward from the rectilinear portions in the first and second layers and the rectilinear portions in the fifth and sixth layers of the slots 18, and between the inclined portions of the third coil end portion 22g that respectively extend outward from the rectilinear portions in the third and fourth layers and the rectilinear portions in the seventh and eighth layers of the slots 18. Thus, the dielectric voltage between different-phase coil end portions that have large electric potential differences can be increased.

From FIG. 10, it can be seen that at the end near the second coil ends 20r the second coil end portions 22f and the crossover wires 23 extend outward from the third and fourth rectilinear portions 22c and 22d in the third and fourth layers of the slots 18 in identical circumferential directions. It can also be seen that the second coil end portions 22f and the crossover wires 23 extend outward from the first and second rectilinear portions 22a and 22b in the fifth and sixth layers of the slots 18 in identical circumferential directions. In other words, in the second coil ends 20r, same-phase coil end portions that extend outward from the rectilinear portions in the third and fourth layers of the slots 18, and from the rectilinear portions in the fifth and sixth layers, are disposed so as to be radially adjacent, and the electric potential difference between the coil end portions is small.

From FIG. 10, it can be seen that the second coil end portions 22f extend outward from the second and third rectilinear portions 22b and 22c in the second and third layers of the slots 18 in opposite circumferential directions, that the crossover wires 23 extend outward from the fourth and first rectilinear portions 22d and 22a in the fourth and fifth layers of the slots 18 in opposite circumferential directions, and that the second coil end portions 22f extend outward from the second and third rectilinear portions 22b and 22c in the sixth and seventh layers of the slots 18 in opposite circumferential directions. In other words, in the second coil end portions 22f, different-phase coil end portions that extend outward from the rectilinear portions in the second and third layers of the slots 18, from the rectilinear portions in the fourth and fifth layers, and from the rectilinear portions in the sixth and seventh layers, cross radially, and the electric potential difference between the coil end portions is large.

In Embodiment 2, in the second coil ends 20r, the insulating sheets 40 are inserted between the inclined portions of the second coil end portions 22f that respectively extend outward from the rectilinear portions in the second and third layers and the rectilinear portions in the sixth and seventh layers of the slots 18, and between the inclined portions of the crossover wires 23 that respectively extend outward from the rectilinear portions in the fourth and fifth layers of the slots 18. Thus, the dielectric voltage between different-phase coil end portions that have large electric potential differences can be increased.

In addition, pairs of insulating sheets 40 are respectively disposed on two radial sides of the flow channels that are formed by the gaps between the inclined portions of the circumferentially adjacent first coil end portions 22e, the flow channels that are formed by the gaps between the inclined portions of the circumferentially adjacent second coil end portions 22f, the flow channels that are formed by the gaps between the inclined portions of the circumferentially adjacent third coil end portions 22g, and the flow channels that are formed by the gaps between the inclined portions of the circumferentially adjacent crossover wires 23. Thus, four sides of each of the flow channels are closed, enabling the liquid coolant to be made to flow effectively.

Embodiment 3

Figure 16:
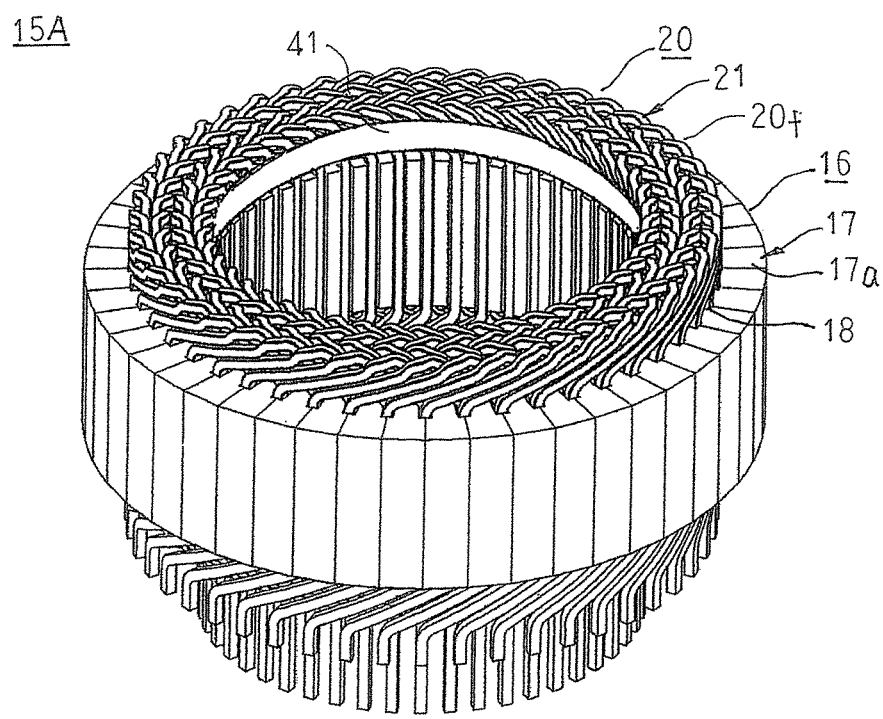
FIG. 16 is an oblique projection that shows a stator that is used in a rotary electric machine according to Embodiment 3 of the present invention.

FIG. 16 is an oblique projection that shows a stator that is used in a rotary electric machine according to Embodiment 3 of the present invention.

In FIG. 16, partitioning wall members 41 are formed into strip shapes using an electrically insulating material such as a glass cloth, a polyetheretherketone, polyphenyl sulfide, or polytetrafluoroethylene, etc., and are disposed around an entire circumference of a stator winding 20 circumferentially inside first and second coil ends 20f and 20r such that a lower end contacts an end surface of a stator core 16.

Moreover, the rest of the configuration is formed in a similar or identical manner to that of Embodiment 1 above.

Consequently, similar or identical effects to those of Embodiment 1 above can also be achieved in Embodiment 3.

According to Embodiment 3, the partitioning wall members 41 are disposed around the entire circumference circumferentially inside the first and second coil ends 20f and 20r of the stator winding 20. Thus, the liquid coolant that has flowed through the first and second coil ends from a radially outer side to a radially inner side is prevented from flowing out of the first and second coil ends 20f and 20r on the radially inner side by the partitioning wall members 41, preventing outflow of the liquid coolant into the air gap between the stator 15 and the rotor 6.

Embodiment 4

Figure 17:
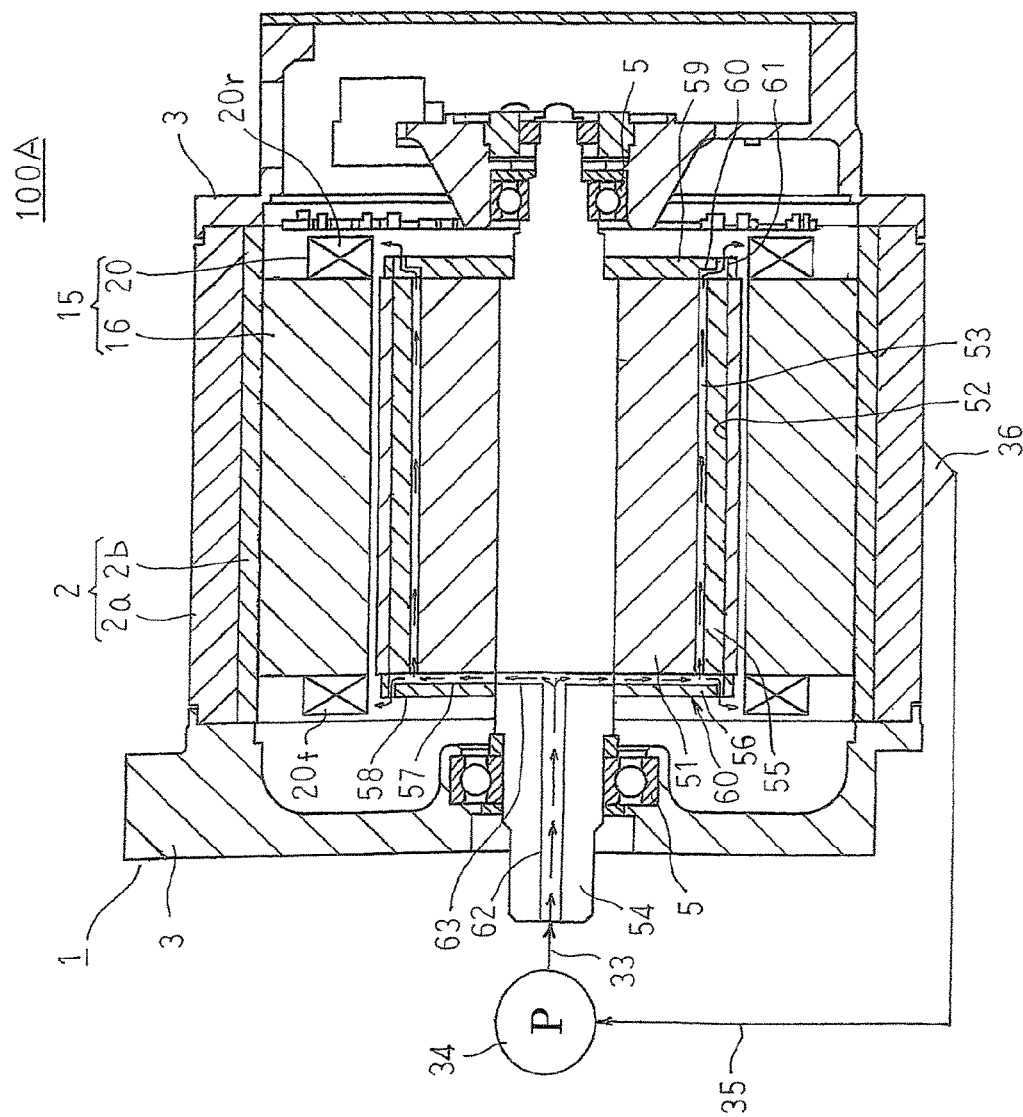
FIG. 17 is a cross section that shows a rotary electric machine according to Embodiment 4 of the present invention.

FIG. 17 is a cross section that shows a rotary electric machine according to Embodiment 4 of the present invention.

In FIG. 17, a rotor 50 includes: an annular rotor core 51; a shaft 54 that is press-fitted and fixed so as to pass through a central axial position of the rotor core 51; eight permanent magnets 55 that are each mounted so as to pass through an outer circumferential side of the rotor core 51; and a first end plate 56 and a second end plate 59 that are press-fitted onto and fixed to the shaft 54, and that are disposed so as to contact two axial end surfaces of the rotor core 51.

The rotor core 51 is produced by laminating and integrating annular core laminations that have been punched from a thin electromagnetic steel sheet. Eight magnet housing apertures 52 are respectively formed at a uniform pitch in a circumferential direction so as to pass axially through an outer circumferential side of the rotor core 51 such that cross sections that are perpendicular to an axial direction of the shaft 54 have an approximately rectangular shape that is constant in the axial direction. Coolant flow channels 53 are formed so as to pass axially through the rotor core 51 radially inside the magnet housing apertures 52 so as to be open to the magnet housing apertures 52. The permanent magnets 55 are housed in the respective magnet housing apertures 52, and are mounted so as to pass through an outer circumferential side of the rotor core 51.

The first end plate 56 is produced into a ring-shaped flat plate that has an outside diameter that is approximately equal to an outside diameter of the rotor core 51. An inlet flow channel 57 is formed by hollowing out a first surface of the first end plate 56 to a constant depth so as to leave an outer circumferential edge portion thereof. Eight first discharging channels 58 are formed at a uniform pitch circumferentially so as to each pass axially through the first end plate 56 so as to link between an outer circumferential portion of the inlet flow channel 57 and a second surface side of the first end plate 56.

The shaft 54 is passed through a central position, and the first end plate 56 is fixed by press-fitting onto the shaft 54 from a first axial end such that the first surface faces toward the rotor core 51. The first surface of the first end plate 56 contacts a first axial end surface of the rotor core 51 such that the opening of the inlet flow channel 57 is closed. The coolant flow channels 53 that are formed on the rotor core 51 are connected to the inlet flow channel 57. The first discharging channels 58 are positioned radially outside the inlet flow channel 57.

The second end plate 59 is produced into a ring-shaped flat plate that has an outside diameter that is approximately equal to an outside diameter of the rotor core 51. A discharging flow channel 60 is formed into a ring shape by hollowing out an outer circumferential side of a first surface of the second end plate 59 to a constant depth. Eight second discharging channels 61 are formed at a uniform pitch circumferentially so as to each pass axially through the second end plate 59 so as to link between the discharging flow channel 60 and a second surface side of the second end plate 59.

The shaft 54 is passed through a central position, and the second end plate 59 is fixed by press-fitting onto the shaft 54 from a second axial end such that the first surface faces toward the rotor core 51. The first surface of the second end plate 59 contacts a second axial end surface of the rotor core 51 such that the opening of the discharging flow channel 60 is closed. The coolant flow channels 53 that are formed on the rotor core 51 are connected to the discharging flow channel 60. The second discharging channels 61 are positioned radially outside each of the coolant flow channels 53.

The shaft 54 includes: an in-shaft flow channel 62 that is formed on a central position so as to extend from a first axial end to a position immediately below the first end plate 56; and branching flow channels 63 that each branch off radially from the in-shaft flow channel 62, and that link between the in-shaft flow channel 62 and the inlet flow channel 57 that is formed on the first end plate 56.

Supply piping 33 links a discharging orifice of a supply pump 34 and the in-shaft flow channel 62, and return piping 35 links an oil pan 36 that is mounted below the frame 2 and a suction orifice of the supply pump 34, to configure a cooling mechanism.

In a rotary electric machine 100A that is configured in this manner, the supply pump 34 is driven such that a liquid coolant is supplied to the inlet flow channel 57 by means of the supply piping 33, the in-shaft flow channel 62, and the branching flow channels 63. A portion of the liquid coolant that is supplied to the inlet flow channel 57 is supplied to the coolant flow channels 53 and serves to cool the permanent magnets 55. A remaining portion of the liquid coolant that is supplied to the inlet flow channel 57 is discharged through the first discharging channel 58. At this point, the liquid coolant is deflected centrifugally due to rotation of the rotor 50, and is sprayed onto inner circumferential surfaces of first coil ends 20f of a stator winding 20. At the same time, the liquid coolant that has served to cool the permanent magnets 55 flows into the discharging flow channel 60, and is discharged through the second discharging channels 61. At this point, the liquid coolant is deflected centrifugally due to the rotation of the rotor 50, and is sprayed onto inner circumferential surfaces of second coil ends 20r of the stator winding 20.

The liquid coolant that is sprayed onto the first coil ends 20f from radially inside flows from the vertex portions toward the roots through the gaps between the inclined portions of the circumferentially adjacent first coil end portions 22e that are positioned on the innermost circumference. Then the liquid coolant flows radially outward over the end surface of the stator core 16, and is sucked up between the root portions of the radially adjacent first coil end portions 22e by capillary action. Next, the liquid coolant flows toward the vertex portions through the gaps between the inclined portions of the first coil end portions 22e that are positioned on a radially outer side of the inclined portions of the first coil end portions 22e that are positioned on the innermost circumference. In addition, the liquid coolant flows radially outward over the end surface of the stator core 16, and is sucked up between the root portions of the radially adjacent third coil end portions 22g by capillary action. Then, the liquid coolant flows toward the vertex portions through the gaps between the inclined portions of the circumferentially adjacent third coil end portions 22g.

In this manner, the liquid coolant that is sprayed onto the first coil ends 20f flows circumferentially through the gaps between the inclined portions of the circumferentially adjacent first coil end portions 22e and the gaps between the inclined portions of the circumferentially adjacent third coil end portions 22g. In addition, the liquid coolant flows radially outward over the end surface of the stator core 16. The liquid coolant thereby flows radially and circumferentially on the first coil ends 20f, and flows inside the first coil ends 20f, cooling the first coil ends 20f effectively.

The liquid coolant that is sprayed onto the second coil ends 20r from radially inside flows from the vertex portions toward the roots through the gaps between the inclined portions of the circumferentially adjacent second coil end portions 22f that are positioned on the innermost circumference. Then the liquid coolant flows radially outward over the end surface of the stator core 16, and is sucked up between the root portions of the radially adjacent second coil end portions 22f by capillary action. Next, the liquid coolant flows toward the vertex portions through the gaps between the inclined portions of the second coil end portions 22f that are positioned on a radially outer side of the inclined portions of the second coil end portions 22f that are positioned on the innermost circumference. In addition, the liquid coolant flows radially outward over the end surface of the stator core 16, and is sucked up between the root portions of the radially adjacent crossover wires 23 by capillary action. Then, the liquid coolant flows toward the vertex portions through the gaps between the inclined portions of the circumferentially adjacent crossover wires 23.

In this manner, the liquid coolant that is sprayed onto the second coil ends 20r flows circumferentially through the gaps between the inclined portions of the circumferentially adjacent second coil end portions 22f and the gaps between the inclined portions of the circumferentially adjacent crossover wires 23. In addition, the liquid coolant flows radially outward over the end surface of the stator core 16. The liquid coolant thereby flows radially and circumferentially on the second coil ends 20r, and flows inside the second coil ends 20r, cooling the second coil ends 20r effectively.

The liquid coolant that has cooled the first and second coil ends 20f and 20r is collected in a lower portion inside the frame 2, and is returned to the supply pump 34 from the oil pan 36 by means of the return piping 35.

Consequently, similar or identical effects to those of Embodiment 1 above can also be achieved in Embodiment 4.

According to Embodiment 4, liquid coolant is sprayed onto inner circumferential surfaces of first and second coil ends 20f and 20r from first and second discharging channels 58 and 61 that are formed on first and second end plates 56 and 59 that are disposed on two axial ends of a rotor core 51. Thus, because the liquid coolant is sprayed onto the inner circumferential surfaces of the first and second coil ends 20f and 20r during rotation of the rotor 50, the liquid coolant can be supplied to the first and second coil ends 20f and 20r uniformly, enabling the first and second coil ends 20f and 20r to be cooled effectively without irregularities.

Moreover, in each of the above embodiments, the winding bodies are produced using conductor wire that has an oblong cross section, but the cross sectional shape of the conductor wire that constitutes the winding bodies is not limited to an oblong shape, and conductor wire that has a circular cross section may be used, for example.

In each of the above embodiments, first through fourth rectilinear portions are arranged in a single column radially inside the slots such that longitudinal directions of long sides of the oblong cross sections are oriented circumferentially, but the first through fourth rectilinear portions may be arranged in a single column radially inside the slots such that longitudinal directions of short sides of the oblong cross sections are oriented circumferentially.

In each of the above embodiments, an eight-pole forty-eight-slot rotary electric machine has been explained, but it goes without saying that the number of poles and the number of slots are not limited to eight poles and forty-eight slots. Furthermore, the slots are formed at a ratio of two slots per phase per pole, but the number of slots per phase per pole is not limited to two, and may be one, or may be three or greater.

In each of the above embodiments, the number of slots is formed at a ratio of two slots per phase per pole, and the spacing between the first and second rectilinear portions of the winding bodies is set to an angular spacing of six slots to configure the stator winding into a full-pitch winding, but the spacing between the first and second rectilinear portions of the winding bodies is not limited to an angular spacing of six slots. For example, if the spacing between the first and second rectilinear portions of the winding bodies is set to an angular spacing of five slots, the stator winding may be configured into a short-pitch winding.

In each of the above embodiments, the winding bodies are produced by winding a conductor wire so as to repeat a δ-shaped coil pattern for two turns in a radial direction, but the winding bodies are not limited to the number of turns in the δ-shaped coil pattern in the radial direction being two, and there may be a single turn, or there may be three or more.

In each of the above embodiments, the liquid coolant is sprayed onto the first and second coil ends of the stator winding from a radial direction, but the liquid coolant may be sprayed onto the first and second coil ends of the stator winding from axially outside.

The invention claimed is:
1. A rotary electric machine comprising:
a housing;
a rotor that is fixed to a shaft that is rotatably supported by said housing such that said rotor is disposed inside said housing;
a stator that includes:
an annular stator core in which slots are arranged circumferentially; and
a stator winding that is mounted to said stator core,
said stator being held on an outer circumferential side of said rotor by said housing such that an air gap is interposed between said stator and said rotor; and a cooling mechanism that supplies a liquid coolant to a coil end of said stator winding to cool said stator winding, wherein:

said stator winding includes a plurality of winding bodies that are each produced by winding a jointless continuous conductor wire that is coated with insulation, and that are arranged at a pitch of one slot in a circumferential direction so as to be mounted into a first slot, a second slot, and a third slot that line up at an angular spacing of n slots in a circumferential direction, where n is a natural number that is greater than or equal to two;

said winding bodies are produced by repeatedly winding a δ-shaped coil pattern that is formed by inserting said conductor wire sequentially into said second slot, said first slot, said second slot, and said third slot, so as to alternate an axial direction of insertion into said first slot, said second slot, and said third slot, form turns in a radial direction, where m is a natural number that is greater than or equal to one, and are configured such that a plurality of rectilinear portions that are respectively inserted into said first slot, said second slot, and said third slot are linked continuously by coil end portions;

said coil end is constituted by said coil end portions; and said liquid coolant that is supplied to said coil end flows through a gap between circumferentially adjacent coil end portions among said coil end portions.

2. The rotary electric machine according to claim 1, wherein positions at which said rectilinear portions of said winding bodies are housed in a radial direction inside said first slot, said second slot, and said third slot are shifted sequentially in a first radial direction by an amount equal to a radial thickness of said rectilinear portions sequentially in order of said second slot, said first slot, said second slot, and said third slot.

3. The rotary electric machine according to claim 2, wherein:

said rectilinear portions are housed in 4 m layers so as to be arranged in a single row in each of said slots; and directions in which said coil end portions extend outward circumferentially from said rectilinear portions that are housed in said slots that are radially adjacent are repeated radially so as to alternate between an identical direction and an opposite direction.

4. The rotary electric machine according to claim 1, wherein a strip-shaped partitioning member is disposed around an entire circumference of said coil end between coil end portions that differ in phase among said coil end portions.

5. The rotary electric machine according to claim 1, wherein a gap between root portions of circumferentially adjacent coil end portions among said coil end portions is larger than said air gap.

6. The rotary electric machine according to claim 1, wherein a strip-shaped partitioning wall member is disposed on an inner circumferential side of said coil end so as to be in contact with said coil end around an entire circumference.

7. The rotary electric machine according to claim 1, wherein said cooling mechanism is configured such that said liquid coolant is sprayed onto said coil end from a radially outer side.

8. The rotary electric machine according to claim 7, wherein said liquid coolant is sprayed onto said coil end so as to be parallel to a direction of inclination of coil end portions that are positioned radially outermost among said coil end portions.

9. The rotary electric machine according to claim 1, wherein said cooling mechanism is configured such that said liquid coolant is sprayed onto said coil end from a radially inner side.

10. A rotary electric machine comprising:

a housing;

a rotor that is fixed to a shaft that is rotatably supported by said housing such that said rotor is disposed inside said housing;

a stator that includes:

an annular stator core in which slots are arranged circumferentially; and a stator winding that is mounted to said stator core, said stator being held on an outer circumferential side of said rotor by said housing such that an air gap is interposed between said stator and said rotor; and a pump that supplies a liquid coolant to a coil end of said stator winding to cool said stator winding, wherein:

said stator winding includes a plurality of winding bodies that are each produced by winding a jointless continuous conductor wire that is coated with insulation, and that are arranged at a pitch of one slot in a circumferential direction so as to be mounted into a first slot, a second slot, and a third slot that line up at an angular spacing of n slots in a circumferential direction, where n is a natural number that is greater than or equal to two;

said winding bodies are produced by repeatedly winding a δ-shaped coil pattern that is formed by inserting said conductor wire sequentially into said second slot, said first slot, said second slot, and said third slot, so as to alternate an axial direction of insertion into said first slot, said second slot, and said third slot, form turns in a radial direction, where m is a natural number that is greater than or equal to one, and are configured such that a plurality of rectilinear portions that are respectively inserted into said first slot, said second slot, and said third slot are linked continuously by coil end portions;

said coil end is constituted by said coil end portions; and said liquid coolant that is supplied to said coil end flows through a gap between circumferentially adjacent coil end portions among said coil end portions.

11. The rotary electric machine according to claim 10, wherein positions at which said rectilinear portions of said winding bodies are housed in a radial direction inside said first slot, said second slot, and said third slot are shifted sequentially in a first radial direction by an amount equal to a radial thickness of said rectilinear portions sequentially in order of said second slot, said first slot, said second slot, and said third slot.

12. The rotary electric machine according to claim 11, wherein:

said rectilinear portions are housed in 4 m layers so as to be arranged in a single row in each of said slots; and directions in which said coil end portions extend outward circumferentially from said rectilinear portions that are housed in said slots that are radially adjacent are repeated radially so as to alternate between an identical direction and an opposite direction.

13. The rotary electric machine according to claim 10, wherein a strip-shaped partitioning member is disposed around an entire circumference of said coil end between coil end portions that differ in phase among said coil end portions.

14. The rotary electric machine according to claim 10, wherein a gap between root portions of circumferentially adjacent coil end portions among said coil end portions is larger than said air gap.

15. The rotary electric machine according to claim 10, wherein a strip-shaped partitioning wall member is disposed on an inner circumferential side of said coil end so as to be in contact with said coil end around an entire circumference.

16. The rotary electric machine according to claim 10, further comprising a frame radially outward of said stator and an opening in said frame, wherein said liquid coolant delivered from said pump is sprayed onto said coil end from a radially outer side through said opening.

17. The rotary electric machine according to claim 16, wherein said liquid coolant delivered from the pump is sprayed onto said coil end so as to be parallel to a direction of inclination of coil end portions that are positioned radially outermost among said coil end portions.

18. The rotary electric machine according to claim 10, further comprising an opening in said rotor, wherein said opening is configured such that said liquid coolant delivered from the pump is sprayed onto said coil end from a radially inner side.

* * * * *